United States Patent
Staats et al.

(10) Patent No.: US 11,794,778 B2
(45) Date of Patent: Oct. 24, 2023

(54) VEHICLE LOCATION DETERMINING SYSTEM AND METHOD

(71) Applicant: Westinghouse Air Brake Technologies Corporation, Pittsburgh, PA (US)

(72) Inventors: Andrew Ryan Staats, Cedar Rapids, IA (US); Joseph Gorman, Cedar Rapids, IA (US); Jeffrey D. Kernwein, Cedar Rapids, IA (US); Stuart J. Barr, Cedar Rapids, IA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 255 days.

(21) Appl. No.: 17/174,065

(22) Filed: Feb. 11, 2021

(65) Prior Publication Data
US 2022/0250649 A1     Aug. 11, 2022

(51) Int. Cl.
| *G06V 20/58* | (2022.01) |
| *B60W 60/00* | (2020.01) |
| *G01C 21/36* | (2006.01) |

(52) U.S. Cl.
CPC .... *B60W 60/0011* (2020.02); *B60W 60/0027* (2020.02); *G01C 21/367* (2013.01); *G01C 21/3676* (2013.01); *G06V 20/58* (2022.01)

(58) Field of Classification Search
CPC .......... B60W 60/0011; B60W 60/0027; G01C 21/367; G01C 21/3676
See application file for complete search history.

(56) References Cited

U.S. PATENT DOCUMENTS

| 2007/0216771 A1* | 9/2007 | Kumar ..................... B61L 27/53 348/148 |
| 2012/0126065 A1* | 5/2012 | Smith ...................... B61L 3/006 246/167 R |
| 2012/0218125 A1* | 8/2012 | Demirdjian ............ G08G 1/164 340/905 |
| 2014/0333771 A1* | 11/2014 | Mian ....................... B61L 27/40 348/149 |
| 2016/0039436 A1* | 2/2016 | Bhagwatkar ........ B61L 15/0027 348/148 |
| 2016/0194014 A1* | 7/2016 | Rajendran ............... B61L 27/70 701/2 |
| 2016/0272196 A1* | 9/2016 | Hocking ............... B60W 30/02 |
| 2017/0032586 A1* | 2/2017 | Cheatham, III ... G06Q 10/0833 |

(Continued)

FOREIGN PATENT DOCUMENTS

WO    WO-2019059090 A1 *  3/2019  ............... G06T 7/00

*Primary Examiner* — Redhwan K Mawari
*Assistant Examiner* — Kathleen B Ward
(74) *Attorney, Agent, or Firm* — THE SMALL PATENT LAW GROUP LLC; Philip S. Hof (57) ABSTRACT

A system and method include a control unit configured to detect a presence of a vehicle within a route area based on sensor signals output by an observer device that monitors the route area. The control unit is configured to determine a distance of the vehicle from the observer device and to determine a vehicle location of the vehicle based on the distance and a predetermined location of the observer device. The system and method include a communication device configured to communicate the vehicle location to at least one of the vehicle or a remote control device that is off-board the vehicle prior to the vehicle starting to move along a route occupied by the vehicle.

19 Claims, 3 Drawing Sheets

(56) References Cited

U.S. PATENT DOCUMENTS

| | | | |
|---|---|---|---|
| 2017/0032587 A1* | 2/2017 | Cheatham, III | G07C 5/008 |
| 2017/0160088 A1* | 6/2017 | Azami | G01C 21/12 |
| 2018/0165532 A1* | 6/2018 | Menon Gopalakrishna | |
| | | | B61L 15/0072 |
| 2020/0158815 A1* | 5/2020 | Staats | B61L 25/025 |
| 2020/0349498 A1* | 11/2020 | Brooks | G06F 18/21 |
| 2021/0319414 A1* | 10/2021 | Khalid | G08G 1/096708 |

* cited by examiner

VEHICLE LOCATION DETERMINING SYSTEM AND METHOD

BACKGROUND

Technical Field

The subject matter herein relates to determining vehicle locations.

Discussion of Art

Tracking the locations of vehicles can be used to map the current locations of multiple vehicles in a region to predict or anticipate potential collisions and implement avoidance measures, thereby increasing safety. Such vehicle tracking can also be used to improve vehicle travel efficiency and throughput by, for example, notifying vehicles to avoid traffic congestion. The benefits of vehicle tracking will increase as vehicles transition to semi and fully autonomous control. Vehicle tracking relies on accurate knowledge of the specific location of each vehicle being tracked. Typically, the location of a vehicle is determined using a location determining device disposed onboard the vehicle, such as a global navigation satellite system (GNSS) receiver that receives signals from one or more satellites. One example of a GNSS receiver is a global positioning system (GPS) receiver that receives signals that are relatively accurate and are generally acceptable means of vehicle location determination that are used by vehicle tracking systems.

In some circumstances, GNSS communications may not be available due to electromagnetic interference and/or obstacles that block the communication pathway with the onboard GNSS receiver. Examples of obstacles that may block GNSS communications include tall buildings, tunnels, overhead structures such as roofs and coverings, mountains, canyons, and the like. When GNSS reception is not available, the location of the vehicle may not be accurately and reliably determined, so some systems that rely on tracking the vehicle location may not be able to operate as desired. Existing alternative options for determining the vehicle location are less reliable and/or less accurate than GNSS tracking. One alternative uses GNSS repeater devices, but the GNSS repeater only provides the location of the repeater so does not accurately reflect the actual location of the vehicle.

It may be desirable to have a system and method for determining vehicle location that does not rely on GNSS such that the system and method are not susceptible to reception issues, yet provides comparable vehicle location accuracy as GNSS tracking.

BRIEF DESCRIPTION

In one or more embodiments, a vehicle location determining system is provided that includes a control unit and a communication device that is communicatively connected to the control unit. The control unit is configured to detect a presence of a vehicle within a route area based on sensor signals output by an observer device that monitors the route area. The control unit is configured to determine a distance of the vehicle from the observer device and to determine a vehicle location of the vehicle based on the distance and a predetermined location of the observer device. The communication device is configured to communicate the vehicle location to at least one of the vehicle or a remote control device that is off-board the vehicle prior to the vehicle starting to move along a route occupied by the vehicle.

In one or more embodiments, a method (e.g., for determining a vehicle location) is provided that includes receiving sensor signals output by an observer device that monitors a route area, and detecting a presence of a vehicle within the route area based on an analysis of the sensor signals. The method also includes determining a distance of the vehicle from the observer device based on the analysis of the sensor signals, and determining a vehicle location of the vehicle based on the distance and a predetermined location at which the observer device is mounted. The method includes generating a message, comprising the vehicle location, to be communicated to at least one of the vehicle or a remote control device that is off-board the vehicle prior to the vehicle starting to move along a route occupied by the vehicle.

In one or more embodiments, a vehicle location determining system is provided that includes a camera, a control unit, and a communication device. The camera is configured to be mounted on a structure proximate to at least one route and oriented to monitor a route area including the at least one route. The control unit includes one or more processors and is configured to be communicatively connected to the camera. The control unit is configured to analyze image data generated by the camera to detect a presence of a vehicle within the route area and determine a distance of the vehicle from the camera. The control unit is configured to identify the vehicle relative to one or more other vehicles based on the image data by determining one or more of a graphical indicium displayed on the vehicle, a shape of the vehicle, or a specific route of the at least one route occupied by the vehicle. The control unit is further configured to determine a vehicle location of the vehicle based on the distance and a predetermined location at which the camera is mounted. The communication device is configured to communicate the vehicle location to at least one of the vehicle or a remote control device off-board the vehicle prior to the vehicle starting to move along a route occupied by the vehicle.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments described herein are directed to a system and method for determining a location of a vehicle. More specifically, the system and method are able to determine the vehicle location even when satellite-based communications, such as GNSS, are unavailable. The system and method can utilize sensors and/or other hardware to indirectly calculate the location of a vehicle based on predetermined knowledge of the location of the sensors and/or other hardware. For example, the location determining system disclosed herein includes at least one observer device that is mounted at a predetermined location, such as an absolute location that can be represented by position coordinates in a coordinate system. The observer device may be mounted on a wayside structure, such as a post or building, and oriented to monitor at least one route. By analyzing sensor signals generated by the observer device, the location determining system can detect the presence of a vehicle on the at least one route and determine a distance from the vehicle to the mounted location of the observer device (e.g., which represents a relative location of the vehicle). Both the relative location of the vehicle and the predetermined location of the observer device can be analyzed to estimate, with relatively high accuracy, the vehicle location. The vehicle location may be an absolute location that can be represented by position coordinates in a coordinate system.

The vehicle location that is determined by the system and method disclosed herein can be used by a control system that tracks the location and/or movement of the vehicle. Such a control system may be configured to increase safety, movement efficiency, and/or throughout along a region of routes by providing situational awareness achievable through the tracking of multiple vehicles. The control system may communicate information to one or more vehicles, such as speed limits, route segment occupancy statuses (e.g., segment "A" is unoccupied, segment "B" is occupied, etc.), slow orders due to maintenance or emergencies, and/or the like. The vehicles have onboard components of the control systems that analyze the received information and control the movement of the vehicles along the routes to comply with relevant movement restrictions included in the information.

In one or more embodiments, the vehicle location that is determined by the vehicle location determining system may be used to initialize the control system prior to a vehicle moving along a route that the vehicle occupies. For example, a stationary vehicle that intends to start traveling on a scheduled trip may first communicate an initialization message to a remote control device that is off-board the vehicle. The initialization message includes the vehicle location of the vehicle, which may be determined based on signals received by a GNSS receiver, the vehicle location determining system, or the like. The initialization message essentially informs the remote control device that the vehicle is stationary and located at a specific set of positional coordinates, and will start moving along the route. Upon receipt, the remote control device may begin tracking the movement of the vehicle. To confirm that the initialization message has been successfully received, the remote control device may communicate a confirmation message back to the vehicle. Optionally, the confirmation message may include additional information, such as a grant of permission for the vehicle to move along the route, one or more movement restrictions related to speed or distance that the vehicle is permitted to travel, and/or one or more occupancy statuses for route segments (e.g., blocks) proximate to the vehicle.

Without the vehicle location determining system and method disclosed herein, when GNSS reception is not available, a control system that relies on vehicle location may not be able to initialize at all, or may initialize in a restricted or limited mode that provides reduced performance or operations relative to a full or unlimited mode. In a non-limiting example, the vehicle location can be used to initialize a positive vehicle control system prior to starting a trip of the vehicle. The positive vehicle control system may be configured to prevent the vehicle from entering a route segment, moving faster than a designated speed, and/or the like, unless a signal is received from an off-board source of the positive vehicle control system granting permission to the vehicle to enter into the route segment, move faster than the designated speed, and/or the like.

One or more technical effects of the embodiments described herein is to provide vehicle location determination that is independent of satellite-based communications, so is not dependent on GNSS reception. For example, the vehicle location determining system can be installed in areas that are known to have no GNSS reception or unreliable GNSS reception, such as in covered vehicle yards and stations, urban canyons that are surrounded by tall buildings, tunnels, mountainous geographic regions, and/or the like. As such, GNSS signals can be used when available, and the vehicle location determining system can be used in specific areas where GNSS is unavailable to avoid lapses in vehicle location determination. Another technical effect of the embodiments described herein is to provide relatively accurate and reliable vehicle location determination that is comparable to GNSS-based tracking. The accuracy achieved may be greater than the accuracy of other methods for determining vehicle location, such as calculating location based on GNSS repeaters.

Figure 1:
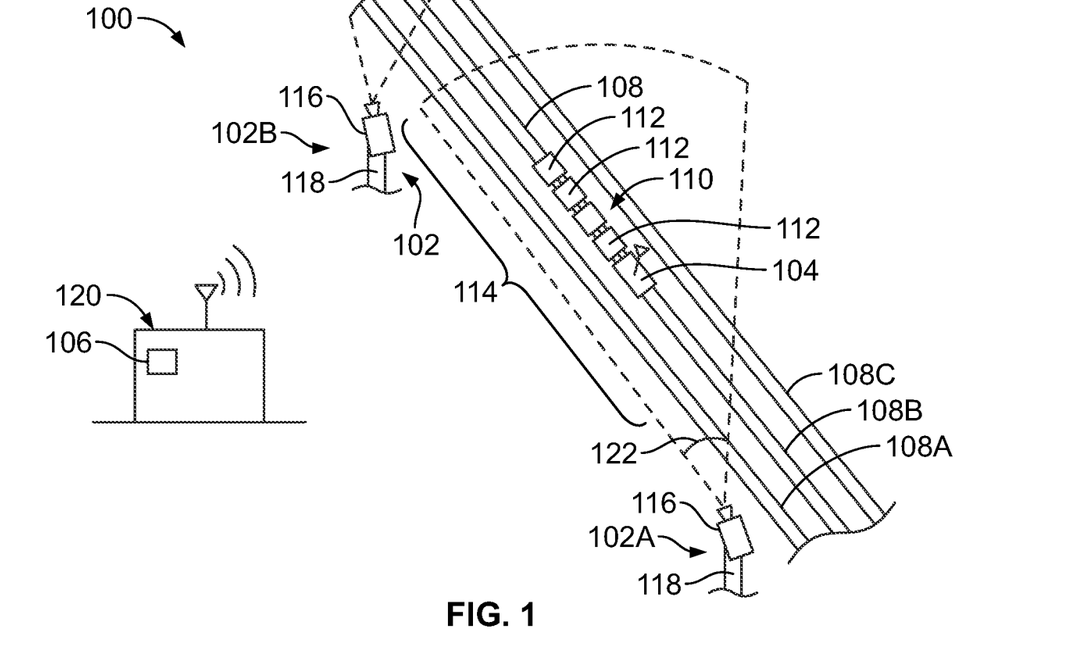
FIG. 1 illustrates a vehicle location determining system according to an embodiment.

FIG. 1 illustrates a vehicle location determining system 100 according to an embodiment. The vehicle location determining system includes at least one wayside monitoring assembly 102, a vehicle 104, and a remote control device 106. Two wayside monitoring assemblies 102A, 102B are shown in FIG. 1. The wayside monitoring assemblies and the remote control device are disposed off-board the vehicle. The wayside monitoring assemblies can communicate with the vehicle and/or the remote control device. In one or more embodiments, the communications between the wayside monitoring assemblies, the vehicle, and/or the remote control device are wireless. In an alternative embodiment, at least one of the wayside monitoring assemblies may be connected to the remote control device via a physical communication pathway, such as an electrical wire or an optical wire. The vehicle travels along a route 108. In the illustrated embodiment, multiple routes 108A, 108B, 108C are disposed in parallel. The vehicle occupies the middle route 108B in FIG. 1. The other two routes 108A, 108C are unoccupied along the illustrated segments of the routes.

In a non-limiting example, one of the wayside monitoring assemblies determines a location of the vehicle on the route (e.g., a vehicle location) and communicates the vehicle location to the vehicle. The vehicle may include the vehicle location received from the wayside monitoring assembly in a message that is communicated to the remote control device. The remote control device may grant permission to the vehicle to move along the route and/or track the progress of the vehicle based on the vehicle location information received. In one or more embodiments, the wayside monitoring assemblies are positioned to monitor sections of the routes that are associated with poor or unreliable GNSS reception, such as sections that would block or otherwise interfere with satellite-based communications. The wayside monitoring assemblies may be installed under roofs or other coverings, along urban canyons surrounded by tall buildings in cities, within underground tunnels and/or stations, within natural canyons between mountains, and/or the like. Optionally, the wayside monitoring assemblies may not be installed in open areas that are associated with good, reliable GNSS reception because the locations of the vehicles can be determined used the onboard GNSS receivers. In one or more embodiments, the vehicle location determining system is independent of GNSS and other satellite-based communication systems, and can be utilized in conjunction with GNSS. For example, when a vehicle is in an area that has good, reliable GNSS reception, GNSS can be used to determine the vehicle location. When the vehicle enters an area that has poor, unreliable GNSS reception, the wayside monitoring assemblies of the vehicle location determining system can be used in lieu of GNSS to provide the vehicle location without providing a substantial drop in location accuracy or reliability. For example, the accuracy and reliability of the vehicle location determining system may be comparable to the location accuracy of GNSS in good reception areas, such as the same or slightly better than GNSS.

The vehicle shown in FIG. 1 is a component of a vehicle system 110 that includes multiple vehicles. The vehicle may be a propulsion-generating vehicle that includes one or more traction motors, combustion engines, and/or the like for generating tractive effort to propel the vehicle system along the route. The vehicle system optionally may include one or more non-propulsion-generating vehicles 112 that are mechanically coupled to the propulsion-generating vehicles and propelled by the propulsion-generating vehicles. The vehicle system may represent a vehicle platoon, swarm, and/or consist (collectively "consist"). Suitable vehicle consists may include a rail vehicle consist (e.g., train) having both propulsion-generating vehicles and non-propulsion-generating vehicles mechanically coupled together by couplers (and may optionally be electrically connected together). In one embodiment, the vehicle system is formed from the single propulsion-generating vehicle and multiple non-propulsion-generating vehicles that are pulled by the propulsion-generating vehicle. In another embodiment, the vehicle system can include multiple propulsion-generating vehicles. Optionally, at least some of the multiple propulsion-generating vehicles may be physically separate from each other but logically coupled with each other to enable communication among the vehicles to coordinate their movements (so that the vehicles move together as a convoy).

Various embodiments shown and described herein are directed to rail-based vehicles. For example, the vehicle 104 may be a locomotive, and the non-propulsion-generating vehicles 112 may be rail cars that carry passengers, cargo, or the like. The routes may be railroad tracks. The vehicle location determining system can also be used for determining the location of other types of vehicles instead of, or in addition to, rail vehicles. Other suitable vehicles may include highway vehicles (e.g., automobiles, trucks, or other vehicles designed and/or permitted for travel on public roadways), off-highway vehicles (e.g., mining vehicles or other vehicles that may not be designed or permitted for travel on public roadways), marine vessels, or the like. For example, the vehicle consist may include a group of communicatively linked on-road vehicles, and the route may be a road. In one embodiment, the vehicle is remote-controlled or autonomous. For example, the vehicle may be controlled at least in part by the remote control device that is off-board the vehicle. Alternatively, the vehicle includes a human operator onboard that can control the vehicle movement.

Each wayside monitoring assembly includes an observer device 116 that is configured to monitor a respective route area 114. The route area is a length of at least one route. In the illustrated embodiment, the route area monitored by the wayside monitoring assembly 102A includes a length of each of the three routes. For example, the observer device is mounted and oriented such that a field of view of the observer device encompasses the route area to detect vehicles within the route area. The observer device may be positioned such that the route area is relatively expansive, such as extending hundreds or thousands of meters along the monitored routes. For example, the wayside monitoring assembly may be located proximate to the routes, and the observer device may be oriented relatively parallel to the length of the routes. The size of the route area that is monitored by the observer device may be limited by properties of the observer device, such as the resolution at long distances and the viewing angle at short distances. Optionally, as shown in FIG. 1, multiple wayside monitoring assemblies can be installed at different locations along the length of the routes to monitor different route areas of the same routes.

Each wayside monitoring assembly may include a structure 118 on which the observer device is mounted. The structure may be a permanent or semi-permanent fixture, such as a building or a pole (e.g., utility pole, light pole, etc.) or post that is installed in the ground. The structure may be proximate to the routes, such as within 20 m, 10 m, or 5 m of the routes. The observer device may be mounted to the structure at a height that is above the heights of the vehicles that travel on the routes to enable the observer device to monitor the routes from an elevated perspective. For example, the observer device may be mounted 7 m, 10 m, 12 m, or the like above the ground (e.g., the routes).

The observer device monitors the route area by generating sensor signals that indicate activity and/or occupancy within the route area. The sensor signals may be image data that depicts the route area, modified waveforms that reflect back to the observer device, and/or the like. The sensor signals generated by the observer device may be used to detect when a vehicle is present in the route area, identify the specific (e.g., particular) route that is occupied by the vehicle, identify the vehicle (relative to one or more other vehicles), and/or determine a distance of the vehicle from the observer device.

In an embodiment, the observer device includes or represents a camera that generates image data within a respective field of view 122 of the camera. The route area may be the portion of the routes that is within the field of view of the camera and within a designated distance of the camera that is associated with satisfactory image data resolution to perform vehicle detection and identification, as described herein. The image data may be in the visible wavelength range and/or the infrared wavelength range of the electromagnetic spectrum. The image data may represent video at a designated frame per second rate. Optionally, the image data may represent still images generated at a designated frequency, such as one image every second, every two seconds, every half second, or the like. The frame rate of the video or the frequency of the still images may be based on application-specific parameters, hardware capability, and/or a permitted speed along the route in the area. For example, a camera may acquire video at a greater frame rate for a route segment with a greater upper speed limit than for a route segment with a lower speed limit to ensure that each mobile asset is captured in at least one frame of the image data. The image data can then be analyzed to identify all of the vehicles that travel through the route area.

In one embodiment, the observer device includes only the camera. In another embodiment, the observer device includes another sensor device in addition to the camera, such as an ultrasonic distance sensor and/or an optical distance sensor. The optical distance sensor may include laser rangefinders. In a third embodiment, the observer device includes an ultrasonic distance sensor and/or an optical distance sensor, but does not include a camera. The sensor signals generated by the observer device can be waveform differential signals generated by the distance sensor(s).

The location of each wayside monitoring assembly (e.g., the observer device thereof) is predetermined. For example, upon installing the wayside monitoring assembly, the crew may determine an absolute location of the wayside monitoring assembly. The absolute location may be represented by positional coordinates in a coordinate system. For example, a survey may be performed to calculate the longitude and latitude coordinates of each wayside monitoring assembly. One way to determine the absolute location of the wayside monitoring assembly is to position a GNSS receiver in the vicinity (e.g., within 100 m) of the wayside monitoring assembly in an area in which the GNSS receiver can communicate with the satellites. For example, the GNSS receiver may be mounted on or above a roof, a building, or a mountain above the wayside monitoring assembly. After determining the positional coordinates of the GNSS receiver using GNSS signals, the offset between GNSS receiver and the wayside monitoring assembly can be measured. For example, the distance and angle between the GNSS receiver and the wayside monitoring assembly can be measured, and such offset data can be combined with the positional coordinates of the GNSS receiver to determine the positional coordinates of the wayside monitoring assembly. The positional coordinates of the wayside monitoring system can represent the predetermined location (e.g., predetermined absolute location) of the observer device. If the wayside monitoring assembly is stationary and fixed in place, the predetermined location of the observer device is static, and can be stored in a database within a memory storage device.

The predetermined location of the observer device can be used to determine the vehicle location of the vehicle that is in the route area, as described herein. Once the vehicle location is determined, the vehicle location can be communicated, such as to the vehicle and/or the remote control device 106 off-board the vehicle. The vehicle location can be used for tracking the vehicle. In a specific example, the vehicle location can be used for initializing a control system that is designed to improve the safety and/or efficiency of vehicle travel. For example, the remote control device off-board the vehicle may represent a portion of a positive vehicle control system configured to prevent the vehicle from moving along the route unless the remote control device grants permission to the vehicle to move along the route. The positive vehicle control system may also prevent the vehicle from entering a route segment (e.g., block) and/or moving faster than a designated speed unless a signal is communicated from the remote control device to the vehicle that grants permission to enter the route segment and/or move faster than the designated speed. Another portion of the positive vehicle control system may be disposed onboard the vehicle. For example, the onboard portion of the positive vehicle control system may package the vehicle location that is determined into a request message that is communicated to the remote control device to initialize the positive vehicle control system. In an embodiment in which the vehicle is a rail-based vehicle, the positive vehicle control system may be a positive train control (PTC) system.

The remote control device may require the vehicle location before allowing the vehicle to move from a stationary position. Otherwise, if the vehicle location is not available and/or is not communicated to the remote control device, the remote control device may not be able to protect the vehicle. Stated differently, without successful initialization of the positive vehicle control system due to the lack of an accurate, reliable vehicle location, the movements of the vehicle may not be tracked or permitted by the positive vehicle control system. In another embodiment, the remote control device may be a portion of a negative vehicle control system that allows the vehicle to move, enter a route segment, move faster than a designated speed, or the like, unless the remote control device generates a message that is communicated to the vehicle to prohibit the vehicle from moving, entering the route segment, and/or moving faster than the designated speed. The remote control device may be located at an off-board facility 120, such as dispatch facility, a cloud storage facility, or the like.

Figure 2:
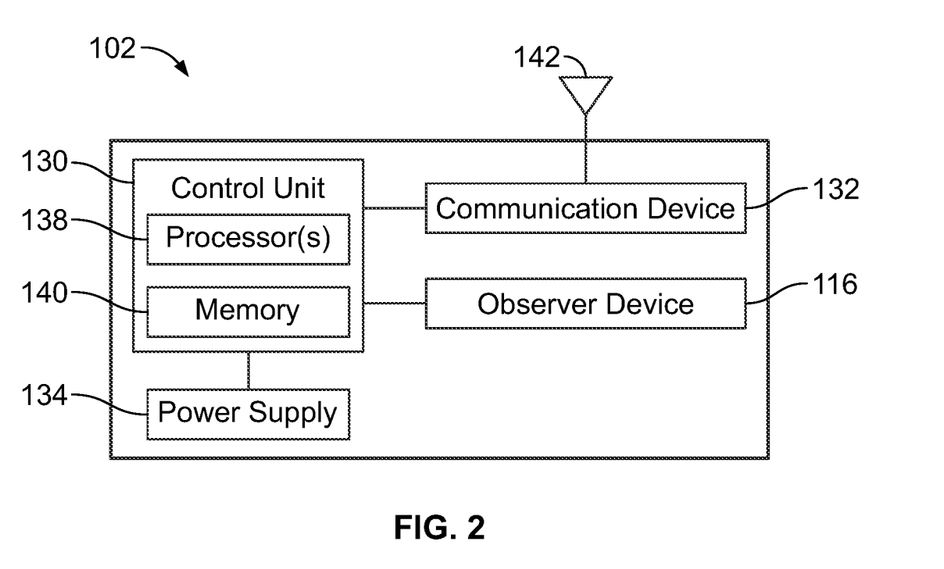
FIG. 2 is a block diagram of one wayside monitoring assembly of the vehicle location determining system according to an embodiment.

FIG. 2 is a block diagram of one wayside monitoring assembly 102 of the vehicle location determining system according to an embodiment. The wayside monitoring assembly 102 includes the observer device 116, a control unit (referred to herein as wayside control unit) 130, a communication device 132, and a power supply 134. These components may be mounted to the structure 118 shown in FIG. 1, such as a pole, post, building, cart, or the like.

The wayside control unit is communicatively connected to the observer device and the communication device. The wayside control unit may be conductively connected to the observer device and the communication device via electrical wires, contactors, optical cables, circuit traces, or the like. Alternatively, the wayside control unit may be wirelessly connected to the observer device and/or the communication device via inductive coupling and/or RF transmitters. The wayside control device receives and analyzes the sensor signals generated by the observer device. The wayside control device may generate messages to be remotely communicated by the communication device, and may receive messages that are received by the communication device. The wayside control device represents hardware circuitry that may include and/or may be connected with one or more processors 138 (e.g., one or more microprocessors, integrated circuits, microcontrollers, field programmable gate arrays, etc.).

The wayside control unit may include and/or may be connected with a tangible and non-transitory computer-readable storage medium (e.g., memory) 140. The memory may include one or more computer hard drives, flash drives, RAM, ROM, EEPROM, and the like. For example, the memory may store programmed instructions (e.g., software) that may be executed by the one or more processors to perform the operations of the wayside control unit described herein, such as operations for detecting the presence of a vehicle in the route area that is monitored by the observer device, identifying a route that the vehicle is occupying, identifying the vehicle, determining a distance of the vehicle from the observer device, and/or determining a vehicle location of the vehicle. Alternatively, at least some instructions that direct operations of the processors may be hard-wired into the logic of the control circuitry of the wayside control unit, such as by being hard-wired logic formed in programmable gate arrays (fpga), complex programmable logic devices (cpld), and/or other hardware. The memory additionally or alternatively may store different information, such as a record of sensor signals/data generated by the observer device, a log of vehicles detected in the route area, the predetermined location of the observer device, control instructions for communicating the vehicle location and/or notifications or alerts to various recipients, and/or the like.

The communication device can represent circuitry that can communicate electrical signals wirelessly and/or via wired connections. For example, the communication device can represent transceiving circuitry, one or more antennas 142, modems, or the like. The transceiving circuitry may include a transceiver, or discrete transmitter and receiver devices. The electrical signals can form data packets that in the aggregate represent messages. In various embodiments, the one or more processors of the wayside control unit can generate messages that are communicated remotely by the communication device. At least some of the messages that are generated can include the vehicle location of a vehicle detected within the route area, as determined (e.g., calculated) by the wayside control unit based on the sensor signals generated by the observer device. The communication device can also receive messages and forward the messages to the one or more processors of the wayside control unit for analysis of the received messages.

The power supply may power one or more components of the wayside monitoring assembly, such as the observer device, the control unit, and/or the communication device. The power supply may include one or more electrical energy storage devices, such as battery cells. The power supply may include additional hardware components, such as a charger for recharging the battery cells. Alternatively, or in addition, the power supply may include a power cable that plugs into a power source, such as a photovoltaic cell that is mounted on the structure, a wind turbine, or a power grid. The photovoltaic cell may be a component of the wayside monitoring assembly. The wayside monitoring assembly may also include other components, such as a light source to illuminate the route area in dark or dim conditions (e.g., at night). The wayside monitoring assembly may also include a speaker, such as to emit audible messages to operators and vehicles nearby.

Figure 3:
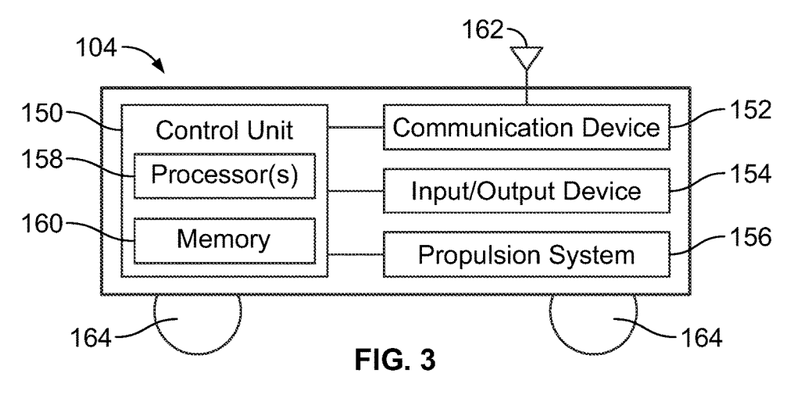
FIG. 3 is a block diagram of a vehicle that occupies a route monitored by one of the wayside monitoring assemblies of the vehicle location determining system according to an embodiment.

FIG. 3 is a block diagram of a vehicle 104 that occupies a route within the route area that monitored by one of the wayside monitoring assemblies of the vehicle location determining system according to an embodiment. The vehicle includes a control unit (referred to herein as vehicle control unit) 150, a communication device 152 (referred to herein as onboard communication device), an input/output device 154, and a propulsion system 156. These components are disposed onboard the vehicle system. For example, all of the components may be onboard the vehicle itself, or at least one component may be onboard another vehicle of the vehicle system.

The vehicle control unit control unit is communicatively connected to the communication device, the input/output device, and the propulsion system via wired and/or wireless communication pathways. The vehicle control device may generate messages to be remotely communicated by the communication device, and may receive messages that are received by the communication device. For example, the vehicle control device may receive, via the communication device, messages sent by the wayside monitoring assembly that include the location of the vehicle, as determined by the wayside monitoring assembly. The vehicle control device may include the received vehicle location in a message that is communicated remotely, such as to the remote control device shown in FIG. 1. The message may be a status message that enables the remote control device to track the vehicle progress along the route, an initialization request message that requests the remote control device to permit the vehicle to move along the route from a stationary state, or the like. The vehicle control device represents hardware circuitry that may include and/or may be connected with one or more processors 158 (e.g., one or more microprocessors, integrated circuits, microcontrollers, field programmable gate arrays, etc.).

The vehicle control unit may include and/or may be connected with a tangible and non-transitory computer-readable storage medium (e.g., memory) 160. The memory may include one or more computer hard drives, flash drives, RAM, ROM, EEPROM, and the like. For example, the memory may store programmed instructions (e.g., software) that may be executed by the one or more processors to perform the operations of the vehicle control unit, such as operations for generating messages to be sent to the remote control device. Alternatively, at least some instructions that direct operations of the processors may be hard-wired into the logic of the control circuitry of the vehicle control unit, such as by being hard-wired logic formed in programmable gate arrays (fpga), complex programmable logic devices (cpld), and/or other hardware. The memory additionally or alternatively may store different information, such as a route database, a trip plan, and/or the like.

The onboard communication device can represent circuitry that can communicate electrical signals wirelessly and/or via wired connections. For example, the communication device can represent transceiving circuitry, one or more antennas 162, modems, or the like. The transceiving circuitry may include a transceiver, or discrete transmitter and receiver devices. The electrical signals can form data packets that in the aggregate represent messages.

The propulsion system may include one or more traction motors connected with axles and/or wheels 164 of the vehicle via one or more gears, gear sets, or other mechanical devices to transform rotary motion generated by the traction motors into rotation of the axles and/or wheels. The propulsion system may also include a combustion engine (e.g., diesel engine) and an alternator to supply electrical energy for powering the one or more traction motors. The propulsion system may include an energy storage system, such as a battery pack, that provides electrical power to the traction motors. In a regenerative braking state, the traction motors may supply electric current generated based on the rotation of the wheels and/or axles for charging energy storage devices (e.g., battery cells) of the energy storage system.

The input/output device can include one or more operator input devices, such as a keyboard, mouse, touchscreen, microphone, or the like for enabling an onboard human operator to enter control commands to the vehicle control unit. The input/output device may also include one or more output devices for presenting information to the operator onboard, such as a speaker, a display screen, lights, and/or the like. In an embodiment in which the vehicle is fully automated or fully remotely controlled such that no human operator is present onboard the vehicle, the vehicle optionally may lack the input/output device.

Figure 4:
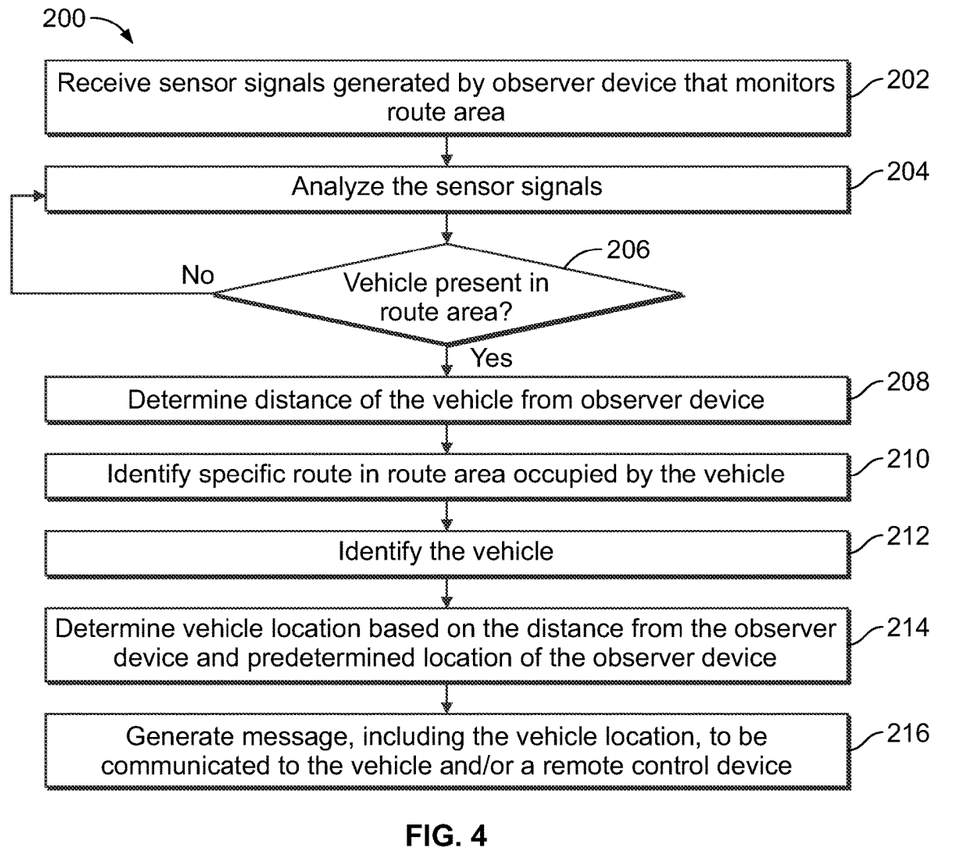
FIG. 4 is a flow chart of a method for determining a location of a vehicle according to an embodiment.

FIG. 4 is a flow chart 200 of a method for determining a location of a vehicle according to an embodiment. Various steps of the method may be performed by the one or more processors 138 of the wayside control unit 130 of the wayside monitoring assembly 102 shown in FIGS. 1 and 2. The method may include additional steps than shown in FIG. 4, fewer steps than shown in FIG. 4, and/or different steps than at least some of the steps shown in FIG. 4. At step 202, sensor signals generated by the observer device 116 are received. The observer device monitors a route area including at least one route. The observer device in an embodiment includes a camera that generates image data of the route area as the sensor signals. The sensor signals may not be limited to image data, or may not include any image data in an alternative embodiment. The sensor signals may be received periodically over time, such as every second, every 5 seconds, every 10 seconds, every 30 seconds, or the like.

At step 204, the sensor signals are analyzed. At 206, it is determined whether a vehicle is present in the route area that is monitored by the observer device, based on the analysis of the sensor signals. In an embodiment in which the sensor signals include image data, the wayside control unit may employ an image analysis technique or algorithm to detect whether any vehicle is depicted within the route area. For example, the wayside control unit may include machine learning (e.g., a neural network or other artificial intelligence), such that the wayside control unit is trained to identify vehicles present in the image data and discern when vehicles are not present in the image data. Optionally, the detection of the vehicle in the route area may be based on other image analysis techniques, such as pixel intensity gradients. In another embodiment, the vehicle may be detected based on proximity signals generated by the observer device. For example, the observer device may emit electromagnetic pulses and may analyze received waveforms, as well as the time delay from emission to receipt, to detect if the waveforms have reflected off of a vehicle within the route area.

If no vehicle is detected as present within the route area, then the method returns to step 204 and newly-generated sensor signals are analyzed. On the other hand, if a vehicle is positively detected, then the method proceeds to step 208. At step 208, a distance of the vehicle from the observer device is determined. The distance may refer to a length of a straight line that extends from the observer device to the vehicle. In an embodiment, the image data generated by a camera of the observer device can be analyzed by the wayside control unit, using a scaling algorithm, to determine (e.g., estimate, calculate, etc.) the relative distance between the observer device and the vehicle that is detected in the route area. The wayside control unit may use the pixels in the image data to determine a size of one or more aspects of the graphical representation of the vehicle in the image data. For example, the wayside control unit may detect, using edge detection or the like, that a width of the vehicle in the image data is three pixels. Then, using a predetermined calibration between pixel size and actual vehicle widths, optionally embedded within a transfer function, the wayside control unit may calculate the estimated distance of the vehicle from the camera. The predetermine calibration optionally may be based on experimental reference data. For example, a vehicle may be sequentially placed at different known distances from a camera, similar to the camera of the observer device, and the graphical representation of the vehicle in the image data captured at each distance can be associated with the distance in a database or look-up table. Furthermore, the relationship between the distance and the size of the graphical representation in the image data, as determined through the experimental data, can be quantified in a transfer function that is used in the field. In a non-limiting example, the image data may be two-dimensional, and the wayside control unit may perform a three-dimensional regression of the two-dimensional image data to calculate the distance.

In an alternative embodiment, the distance may be determined using an ultrasonic and/or optical distance sensor of the observer device. For example, the distance sensor may emit a waveform towards the vehicle and then determine the distance of the vehicle based on the time delay until a reflected waveform is received at the distance sensor and/or based on a modification of the waveform. For example, the distance sensor may represent a laser rangefinder.

At 210, a specific route that is occupied by the vehicle is identified. The route area may include multiple routes that are proximate to each other, such as multiple parallel segments of different routes. In a non-limiting example, the wayside monitoring assembly may be located in a station, depot, or yard that accommodates multiple vehicles at the same time and has a plurality of routes proximate to each other. It may be useful to identify the specific route that is occupied by the vehicle as a means to assist in determining the vehicle location, as described herein, and/or to identify which vehicle the vehicle location refers to. The specific route may be identified by analyzing the image data generated by the camera of the observer device. For example, the wayside control unit may have the machine learning that is trained to select the route of multiple routes depicted in the image data that is occupied by the vehicle. With reference to FIG. 1, the wayside control unit may be able to identify that there is a route 108 on both sides of the vehicle 104 in the route area, and can deduce based on this information, and a knowledge that there is only three routes in the route area, that the vehicle occupies the middle route of the three. Alternatively, other types of sensors, such as weight/force/piezoelectric sensor devices, proximity sensors, and the like, may be installed along the routes and communicatively connected to the wayside control unit for providing sensor signals that can be used to identify the occupied route.

At 212, the vehicle that is detected in the route area is identified. In an embodiment, the vehicle may be identified, at least relative to one or more other vehicles, based on image analysis of the image data generated by the camera of the observer device. The identification may, but need not, constitute a unique identification that identifies the vehicle relative to all other vehicles. For example, the identification may include detecting and deciphering a unique alphanumeric identifier, such as a license plate, that is uniquely assigned to the particular vehicle. In another example, if the unique alphanumeric identifier is not located or decipherable, it may be sufficient to identify a type of the vehicle, a make or model of the vehicle, a length or number of vehicles in the vehicle system, a type of cargo carried by the vehicle, a color of the vehicle, non-alphanumeric graphical indicia displayed on the vehicle, a shape of the vehicle, or the like. Such relative identifications may be combined with additional information, such as the specific route that is identified to be occupied by the vehicle, to determine a more unique identification.

Figure 5:
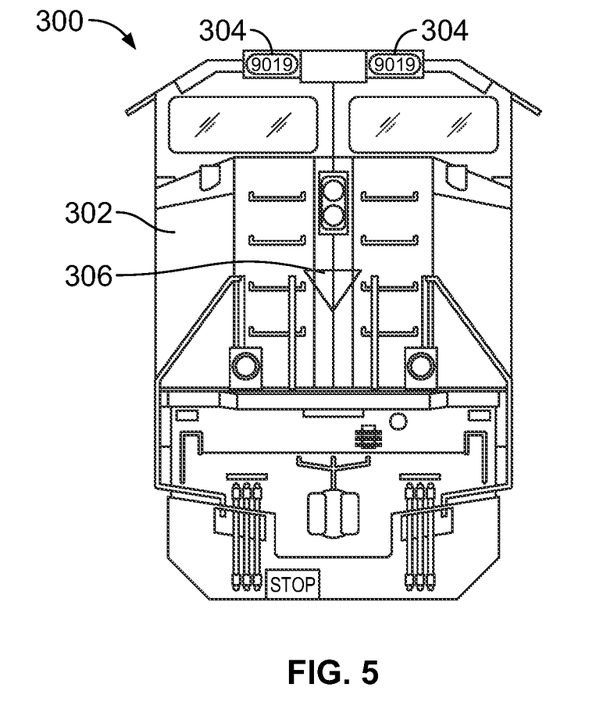
FIG. 5 illustrates an image of a vehicle according to an embodiment.

FIG. 5 illustrates an image 300 of a vehicle 302 according to an embodiment. The image may represent image data that is generated by a camera of the observer device. The wayside control unit may perform image analysis on the image to identify the vehicle. For example, the wayside control unit may determine a shape of the vehicle by performing edge detection or the like. The shape refers to the form factor or outline of the vehicle as depicted in the image data. Upon determining the shape, the wayside control unit may compare the shape to the shapes of known vehicles, such as different vehicle types, makes, and models. The shapes of known vehicles may be stored in a database within the memory 140 shown in FIG. 2. Upon detecting a match between the shape of the vehicle and a shape that is stored in the database, within at least a designated confidence threshold, the wayside control unit may identify the vehicle as the same type, make, and/or model as the vehicle that has the matching shape in the database. In the illustrated embodiment, the shape of the vehicle may be determined to correspond to a certain manufacturer and/or model of locomotives.

In another example, the wayside control device may analyze the image data to detect and decipher at least one graphical indicium that is displayed on the vehicle. The graphical indicium may include an alphanumeric character string, such as a Federal Railroad Association identifier (FRA ID), an owner or operator company name, and/or the like, that is painted, bonded, adhered, or otherwise displayed on an exterior of the vehicle. The graphical indicium may also include non-alphanumeric indicia, such as logos, paint colors, paint schemes, and the like. Optionally, upon detecting the general shape of the vehicle and associating the vehicle with a known type, maker, and/or model of vehicle as described above, the wayside control device may analyze the image data in specific areas of the vehicle that typically include graphical indicia. For example, based on the identified type of vehicle, the wayside control unit may determine that a unique identifier is located near the roof of the vehicle. As a result, the wayside control unit may analyze the image data in a region near the top of the vehicle, either exclusively or at least before analyzing other regions of the vehicle depicted in the image data. Within the targeted region, the wayside control unit may analyze the image data for characters, such as letters and numbers, which are located adjacent to one another. In the illustrated embodiment, the wayside control unit may detect and then decipher the alphanumeric identifier 304 "9019". Furthermore, the wayside control unit may detect and decipher the logo 306. Both the alphanumeric identifier and the logo represent graphical indicia that can be used to identify the vehicle detected in the route area.

Referring now back to the flow chart in FIG. 4, at step 214 the vehicle location of the vehicle is determined based at least on the distance from the observer device and the predetermined location of the observer device. In an embodiment, the vehicle location is an absolute location of the vehicle within a coordinate system. The absolute location is determined by combining the predetermined absolute location of the observer device with the relative distance that is determined from the observer device to the vehicle. In at least one embodiment, the vehicle is stationary and the vehicle location is calculated in order to permit the vehicle to move along the route. When the vehicle is stationary, there is no risk of errors and uncertainties introduced by vehicle movement.

Figure 6:
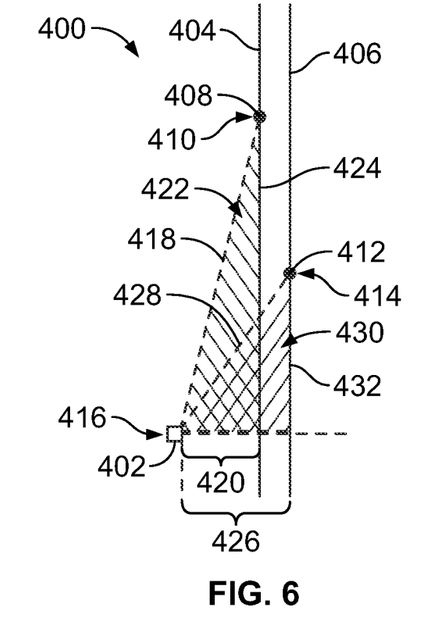
FIG. 6 illustrates a diagram showing an observer device mounted proximate to a first route and a second route according to an embodiment.

FIG. 6 illustrates a diagram 400 showing an observer device 402 mounted proximate to a first route 404 and a second route 406 according to an embodiment. The observer device 402 may be the observer device 116 shown in FIG. 1 and FIG. 2. A first vehicle 408 occupies the first route at a first vehicle location 410. A second vehicle 412 occupies the second route at a second vehicle location 414. The first and second routes are shown as parallel in the diagram, but need not be parallel. The observer device is located at a predetermined location 416. For example, the predetermined location may have positional coordinates $(x_1, y_1)$. It is assumed that both vehicles are detected within the route area monitored by the observer device.

The diagram in FIG. 6 indicates how the specific route identification can be used with the distance determination and the predetermined location of the observer device to determine the vehicle location of a corresponding vehicle. For example, as described above with reference to step 208, the wayside control unit may determine the distance 418 from the observer device to the first vehicle. As described with reference to step 210, the wayside control unit may identify that the first vehicle occupies the first route of the two routes. The observer device may be located proximate to the routes, such that a distance 420 from the observer device to the first route may be measured and stored in the memory as a predetermined value. As shown in FIG. 6, the distance 418 and the distance 420 form two sides of a right triangle 422, specifically the hypotenuse and the short leg. The Pythagorean theorem can be used to calculate the length 424, along the first route, from the first vehicle to the observer device. In the illustrated embodiment, the vehicle location of the first vehicle can be determined by taking the known positional coordinates of the observer device $(x_1, y_1)$ and then adding the length 420 in the x-direction and the length 424 in the y-direction. For example, the vehicle location of the first vehicle may have the positional coordinates $(x_1 + \text{length}_{420}, y_1 + \text{length}_{424})$.

Similarly, a distance or length 426 from the observer device to the second route may be measured and stored in the memory as a predetermined value. The wayside control unit may determine the distance 428 from the observer device to the second vehicle, and may identify that the second vehicle occupies the second route. As shown in FIG. 6, the distance 426 and the distance 428 form two sides of a right triangle 430. The Pythagorean theorem can be used to calculate the length 432, along the second route, from the second vehicle to the observer device. In the illustrated embodiment, the vehicle location of the second vehicle can be determined by taking the known positional coordinates of the observer device $(x_1, y_1)$ and then adding the length 426 in the x-direction and the length 432 in the y-direction. Although not all routes may be linear as shown in FIG. 6, in general the length along the specific occupied route can be calculated from the observer device to the vehicle, and that length can be added to the positional coordinates of the observer device to determine the positional coordinates (e.g., the absolute location) of the vehicle on the route.

The vehicle locations are determined completely independent of satellite communications, such as GNSS. For example, the wayside control unit determines the vehicle location of each vehicle in the monitored route area without using GNSS signals from a GNSS receiver. The vehicle location determining system can be used in areas where GNSS reception is unavailable or compromised.

Referring now back to the flow chart in FIG. 4, at step 216 once the vehicle location of the vehicle that is detected within the route area is determined, a message may be generated that includes the vehicle location. The message may be generated by the wayside control unit to be communicated, by the communication device 132 shown in FIG. 2, to the vehicle itself, to the remote control device off-board the vehicle, and/or the like. In an embodiment, the wayside monitoring assembly may periodically broadcast location messages that are able to be received by any vehicles within range. A location message may include a vehicle identifier corresponding to the intended recipient of the message and the vehicle location of the intended recipient as determined according to the method. The vehicle identifier may include a specific route that is occupied by the intended recipient vehicle, a graphical indicium that is deciphered or detected on the intended recipient vehicle, and/or the like. For example, a location message may essentially state that the vehicle on route B which has identifier "9019" is located at positional coordinates ($x_4$, $y_9$). If other vehicles in the proximity receive that location message, such vehicles would know to ignore the message because they are not the intended recipient. If multiple vehicles are in the route area, the wayside monitoring assembly may sequentially broadcast location messages to each of the vehicles in turn. In an alternative embodiment, the wayside monitoring assembly may use the vehicle identification of the intended recipient vehicle to look up, such as in a table or address book, a specific communication pathway for transmitting the vehicle location directly to the intended recipient vehicle without broadcasting the information.

Once a vehicle receives its vehicle location from the wayside monitoring assembly, the vehicle may communicate the vehicle location for permitting the vehicle to start moving along the route. For example, the onboard control unit 150 shown in FIG. 3 may include the vehicle location in an initialization request message that is communicated to the remote control device. The initialization request message essentially requests the remote control device to grant the vehicle permission to move along the route according to the supervision and tracking provided by the remote control device. Upon receiving permission from the remote control device, the onboard control unit on the vehicle may release the brakes and activate the propulsion system to start propelling the vehicle along the route. Optionally, the vehicle may compare the received vehicle location information to a last known location of the vehicle that is stored in a memory device (e.g., the memory 160) of the vehicle. For example, when the vehicle previously came to a stop, the vehicle may have stored its last known location in the memory. It is possible that the vehicle was moved in the interim between the time that the last known location was determined and the time that the vehicle received the vehicle location from the wayside monitoring assembly. The comparison between the last known location and the determined vehicle location can be used to determine if the vehicle has been moved in the interim.

In an alternative embodiment, the communication device of the wayside monitoring assembly may communicate the vehicle location directly to the remote control device instead of, or in addition to, communicating the vehicle location to the vehicle. The remote control device may use the received vehicle location to update a map of vehicles that are tracked by the remote control device in real-time.

Figure 7:
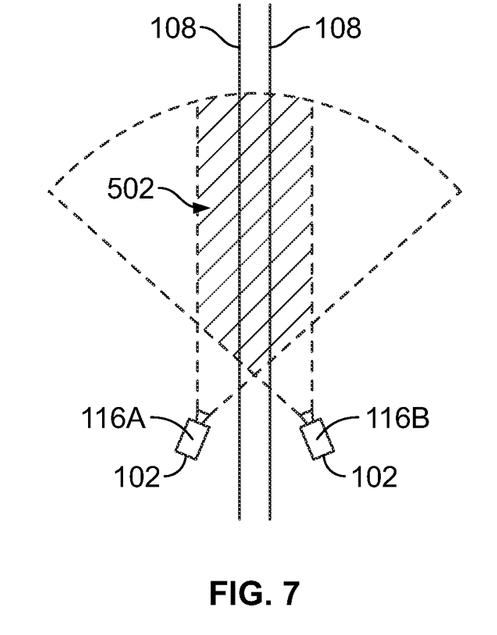
FIG. 7 is an illustration of the vehicle location determining system according to another embodiment in which the observer devices of two different wayside monitoring assemblies monitor overlapping route areas.

FIG. 7 is an illustration of the vehicle location determining system according to another embodiment in which the observer devices 116 of two different wayside monitoring assemblies 102 monitor overlapping route areas. For example, a first observer device 116A and a second observer device 116B are located on opposite sides of the routes 108. The fields of view of the observer devices overlap to define a combined route area 502 that is monitored by both observer devices. Stated differently, the route area monitored by the first observer device overlaps the route area monitored by the second observer device at the combined route area 502. In an embodiment, the wayside control unit may perform the method described with reference to FIG. 4, except that sensor signals from both observer devices are received and analyzed. By analyzing overlapping image data or other sensor signals generated by different observer devices at different locations, the wayside control unit may be able to increase the accuracy of the vehicle location determination, at the expense of additional computation and analysis. For example, assuming that the method in FIG. 4 is performed on the sensor signals generated by the first observer device, the wayside control unit may also perform the method on the sensor signals generated by the second observer device. More specifically, the wayside control unit may analyze the second sensor signals to determine a second distance of the vehicle from the second observer device. Then, the wayside control unit may combine the data to determine the vehicle location of the vehicle based on (i) the distance of the vehicle from the first observer device, (ii) the predetermined location at which the first observer device is mounted, (iii) the second distance of the vehicle from the second observer device, and (iv) a second predetermined location at which the second observer device is mounted.

As described above, the location of the vehicle may be required for a stationary vehicle to receive permission from a vehicle control system, such as a positive vehicle control system, to move along a route. The onboard control unit 150 shown in FIG. 3 of the vehicle may rely on GNSS signals and/or the vehicle location as determined by the vehicle location determining system 100 described herein. For example, if GNSS reception is good, the onboard control unit may use GNSS signals received by an onboard GNSS receiver to determine the vehicle location, and may generate an initialization request message that includes the GNSS-based vehicle location. In areas where GNSS reception is poor, but one or more wayside monitoring assemblies of the vehicle location determining system are present, the onboard control unit may receive a vehicle location that is determined by the vehicle location determining system, and may include that vehicle location in the initialization request message. The remote control device may value both GNSS and the vehicle location determining system as accurate, reliable sources of vehicle location.

In an area where neither GNSS nor the vehicle location determining system is available, as a fallback the onboard control unit may select the last known location of the vehicle as the vehicle location. For example, the onboard control unit may access, in the memory 160, the most recently stored vehicle location information that is reliable and use that location as a baseline. The onboard control unit may attempt to validate the last known location as accurate. For example, the onboard control unit may generate a notification message that is displayed to a human operator that controls the vehicle. The notification message may provide the last known location and inquire the operator as to whether the vehicle is currently located at that last known location. If the onboard control unit receives a user input from the operator indicating that the operator assents, the onboard control unit may identify the last known location as validated, albeit at a reduced level of confidence (e.g., a greater uncertainty) than if the vehicle location is determined by GNSS or the vehicle location determining system. Another way to validate the last known location is to compare the last known location to a location of a nearby GNSS repeater. For example, the last known location may be validated if the last known location is within a designated proximity threshold of the nearby GNSS repeater.

In an embodiment, the onboard control unit may be able to review a log of vehicle activity, such as tachometer data, to determine the movement of the vehicle, if any, after the last known location was recorded. The onboard control unit may use dead reckoning to determine a distance of movement based on the vehicle movement data, wheel diameter, and the like. Based on the dead reckoning and knowledge of the route provided in a route database, the onboard control unit may calculate the current vehicle location by adding the extrapolated movement to the last known location.

After validating last known location and/or calculating the vehicle location based on the last known location, the onboard control unit may generate the initialization request message for communication to the remote control device to request permission to travel along the route. The initialization request message may notify the remote control device that the vehicle location has inherent uncertainty due to the reliance on the last known location. In response, the remote control device may grant the vehicle permission to move along the route in a restricted mode. In the restricted mode, the onboard control unit may be permitted to move along the route without violating certain designated constraints, such as an upper speed limit, a distance of travel, and/or the like. The designated constraints may be more constrictive than regulatory constraints, such as a posted speed limit. As a result, the vehicle may travel slower than the vehicle would be permitted to travel had the vehicle been able to provide a more accurate and reliable vehicle location to the remote control device. Once the vehicle does receive a more accurate and reliable vehicle location, such as via GNSS or the vehicle location determining device, the vehicle can communicate the more accurate and reliable vehicle location in a message to the remote control device, and the remote control device may lift the restricted mode, allowing the vehicle to move in an unrestricted mode.

In an embodiment, a system is provided that includes a control unit and a communication device that is communicatively connected to the control unit. The control unit is configured to detect a presence of a vehicle within a route area based on sensor signals output by an observer device that monitors the route area. The control unit is configured to determine a distance of the vehicle from the observer device and to determine a vehicle location of the vehicle based on the distance and a predetermined location of the observer device. The communication device is configured to communicate the vehicle location to the vehicle and/or a remote control device that is off-board the vehicle prior to the vehicle starting to move along a route occupied by the vehicle.

Optionally, the communication device is configured to communicate the vehicle location within an initialization message directed to the remote control device. The initialization message is communicated to establish communications between the vehicle and the remote control device.

Optionally, the control unit is configured to be onboard the vehicle. The control unit comprises a portion of a vehicle control system configured to prevent the vehicle from moving along the route unless the control unit receives a signal from the remote control device, responsive to receiving the vehicle location, that indicates that a segment of the route occupied by the vehicle is unoccupied by other vehicles.

Optionally, the control unit is configured to determine the vehicle location of the vehicle without using a signal from a global navigation satellite system (GNSS) receiver.

Optionally, the route area encompasses multiple routes, and the control unit is configured to identify which of the multiple routes is occupied by the vehicle based on the sensor signals output by the observer device.

Optionally, the control unit is configured to detect the presence of the vehicle within the route area and determine the distance of the vehicle from the observer device by analyzing image data output by a camera of the observer device. The control unit may be configured to determine the distance of the vehicle from the observer device by comparing a size of a graphical representation of at least a portion of the vehicle depicted in the image data to reference data stored in a memory device. The control unit may be configured to analyze the image data output by the camera to identify the vehicle relative to one or more other vehicles based on a graphical indicium displayed on the vehicle and/or a shape of the vehicle.

Optionally, the control unit is configured to determine the distance of the vehicle from the observer device by analyzing the sensor signals output by an ultrasonic distance sensor and/or an optical distance sensor of the observer device.

Optionally, the observer device is a first observer device, and the control unit is configured to receive second sensor signals from at least a second observer device that is spaced apart from the first observer device to monitor a second route area that at least partially overlaps the route area monitored by the first observer device. The control unit is configured to analyze second sensor signals generated by the second observer device to determine a second distance of the vehicle from the second observer device. The control unit is configured to determine the vehicle location of the vehicle based on the distance of the vehicle from the first observer device, the predetermined location at which the first observer device is mounted, the second distance of the vehicle from the second observer device, and a second predetermined location at which the second observer device is mounted.

Optionally, the route occupied by the vehicle comprises a track and the vehicle is a rail vehicle configured to travel on the track.

Optionally, responsive to determining the vehicle location of the vehicle, the control unit is configured to compare the vehicle location that is determined to a last known location of the vehicle stored in a memory device.

Optionally, responsive to determining that the vehicle is not present within the route area and signals from a GNSS receiver are not available, the control unit is configured to select a last known location of the vehicle stored in a memory device as the vehicle location. The communication device is configured to communicate the last known location to the vehicle and/or the remote control device with a notification that the last known location includes a positional uncertainty.

Optionally, responsive to determining that the vehicle is not present within the route area and signals from a GNSS receiver are not available, the control unit is configured to select a last known location of the vehicle stored in a memory device as the vehicle location. The control unit is configured to restrict a speed and/or distance that the vehicle moves along the route until the vehicle is present within the route area and/or the signals from the GNSS receiver are available.

In an embodiment, a method is provided that includes receiving sensor signals output by an observer device that monitors a route area, and detecting a presence of a vehicle within the route area based on an analysis of the sensor signals. The method also includes determining a distance of the vehicle from the observer device based on the analysis of the sensor signals, and determining a vehicle location of the vehicle based on the distance and a predetermined location at which the observer device is mounted. The method includes generating a message, comprising the vehicle location, to be communicated to the vehicle and/or a remote control device that is off-board the vehicle prior to the vehicle starting to move along a route occupied by the vehicle.

Optionally, the method further includes determining that signals from a GNSS receiver onboard the vehicle are not available. The message is generated to include the vehicle location that is determined in response to the determination that the signals from the GNSS receiver are not available.

Optionally, the route area encompasses multiple routes, and the method further comprises identifying which of the multiple routes is occupied by the vehicle based on the sensor signals generated by the observer device. The vehicle location of the vehicle is determined based also on the route that is identified as occupied by the vehicle.

Optionally, receiving the sensor signals output by the observer device includes receiving image data generated by a camera of the observer device.

Optionally, the method further includes identifying the vehicle relative to one or more other vehicles based on one or both of a graphical indicium displayed on the vehicle in the image data or a shape of the vehicle in the image data.

In an embodiment, a system is provided that includes a camera, a control unit, and a communication device. The camera is configured to be mounted on a structure proximate to at least one route and oriented to monitor a route area including the at least one route. The control unit includes one or more processors and is configured to be communicatively connected to the camera. The control unit is configured to analyze image data generated by the camera to detect a presence of a vehicle within the route area and determine a distance of the vehicle from the camera. The control unit is configured to identify the vehicle relative to one or more other vehicles based on the image data by determining one or more of a graphical indicium displayed on the vehicle, a shape of the vehicle, or a specific route of the at least one route occupied by the vehicle. The control unit is further configured to determine a vehicle location of the vehicle based on the distance and a predetermined location at which the camera is mounted. The communication device is configured to communicate the vehicle location to the vehicle and/or a remote control device off-board the vehicle prior to the vehicle starting to move along a route occupied by the vehicle.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term may include tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors configured to detect a presence of a vehicle within a route area based on first sensor signals output by a first observer device that monitors the route area, the one or more processors configured to receive second sensor signals output by a second observer device that is spaced apart from the first observer device and monitors the route area,
   the one or more processors configured to analyze the first sensor signals to determine a first distance of the vehicle from the first observer device, and to analyze the second sensor signals to determine a second distance of the vehicle from the second observer device,
   the one or more processors configured to determine a vehicle location of the vehicle based on (i) the first distance, (ii) the second distance, (iii) a first predetermined location of the first observer device, and (iv) a second predetermined location of the second observer device; and
   a communication device communicatively connected to the one or more processors and configured to communicate the vehicle location to at least one of the vehicle or a remote control device that is off-board the vehicle prior to the vehicle starting to move along a route occupied by the vehicle.

2. The system of claim 1, wherein the communication device is configured to communicate the vehicle location within an initialization message directed to the remote control device, wherein the initialization message is communicated to establish communications between the vehicle and the remote control device.

3. The system of claim 1, wherein the one or more processors are onboard the vehicle and represent a portion of a vehicle control system configured to prevent the vehicle from moving along the route unless the one or more processors receive a signal from the remote control device, responsive to receiving the vehicle location, that indicates that a segment of the route occupied by the vehicle is unoccupied by other vehicles.

4. The system of claim 1, wherein the one or more processors are configured to determine the vehicle location of the vehicle without using a signal from a global navigation satellite system (GNSS) receiver.

5. The system of claim 1, wherein the route area encompasses multiple routes, and the one or more processors are configured to identify which of the multiple routes is occupied by the vehicle as part of the vehicle location that is determined.

6. The system of claim 1, wherein the one or more processors are configured to detect the presence of the vehicle within the route area and determine the first distance of the vehicle from the first observer device by analyzing image data output by a camera of the first observer device.

7. The system of claim 6, wherein the one or more processors are configured to determine the first distance of the vehicle from the first observer device by comparing a size of a graphical representation of at least a portion of the vehicle depicted in the image data to reference data stored in a memory device.

8. The system of claim 6, wherein the one or more processors are configured to analyze the image data output by the camera to identify the vehicle relative to one or more other vehicles based on at least one of a graphical indicium displayed on the vehicle or a shape of the vehicle.

9. The system of claim 1, wherein the one or more processors are configured to determine the first distance of the vehicle from the first observer device by analyzing the sensor signals output by at least one of an ultrasonic distance sensor or an optical distance sensor of the first observer device.

10. The system of claim 1, wherein the route occupied by the vehicle comprises a track and the vehicle is a rail vehicle configured to travel on the track.

11. The system of claim 1, wherein, responsive to determining the vehicle location of the vehicle, the one or more processors are configured to compare the vehicle location that is determined to a last known location of the vehicle stored in a memory device.

12. The system of claim 1, wherein, responsive to determining that the vehicle is not present within the route area and signals from a GNSS receiver are not available, the one or more processors are configured to select a last known location of the vehicle stored in a memory device as the vehicle location, and the communication device is configured to communicate the last known location to the at least one of the vehicle or the remote control device with a notification that the last known location includes a positional uncertainty.

13. The system of claim 1, wherein, responsive to determining that the vehicle is not present within the route area and signals from a GNSS receiver are not available, the one or more processors are configured to select a last known location of the vehicle stored in a memory device as the vehicle location, the one or more processors configured to restrict at least one of a speed or a distance that the vehicle moves along the route until at least one of the vehicle is present within the route area or the signals from the GNSS receiver are available.

14. A method comprising:
receiving first sensor signals output by a first observer device that monitors a route area;
receiving second sensor signals output by a second observer device that is spaced apart from the first observer device and monitors the route area;
detecting a presence of a vehicle within the route area based on an analysis of at least the first sensor signals;
determining a first distance of the vehicle from the first observer device based on the first sensor signals;
determining a second distance of the vehicle from the second observer device based on the second sensor signals;
determining a vehicle location of the vehicle based on (i) the first distance, (ii) the second distance, (iii) a first predetermined location of the first observer device, and (iv) a second predetermined location of the second observer device; and
generating a message, comprising the vehicle location, to be communicated to at least one of the vehicle or a remote control device that is off-board the vehicle prior to the vehicle starting to move along a route occupied by the vehicle.

15. The method of claim 14, further comprising determining that signals from a GNSS receiver onboard the vehicle are not available, wherein the message is generated to include the vehicle location that is determined in response to the determination that the signals from the GNSS receiver are not available.

16. The method of claim 14, wherein the route area encompasses multiple routes, and the method further comprises identifying which of the multiple routes is occupied by the vehicle as part of the vehicle location of the vehicle that is determined.

17. The method of claim 14, wherein receiving the first sensor signals output by the first observer device comprises receiving image data generated by a camera of the first observer device.

18. The method of claim 17, further comprising identifying the vehicle relative to one or more other vehicles based on one or both of a graphical indicium displayed on the vehicle in the image data or a shape of the vehicle in the image data.

19. A system comprising:
a first camera oriented to monitor a route area including at least one route;
a second camera spaced apart from the first camera and oriented to monitor the route area;
one or more processors configured to analyze first image data generated by the first camera to detect a presence of a vehicle within the route area and determine a first distance of the vehicle from the first camera, wherein the one or more processors are configured to identify the vehicle relative to one or more other vehicles based on the first image data by determining one or more of a graphical indicium displayed on the vehicle, a shape of the vehicle, or a specific route of the at least one route occupied by the vehicle,
the one or more processors configured to analyze second image data generated by the second camera to determine a second distance of the vehicle from the second camera,
the one or more processors configured to determine a vehicle location of the vehicle based on (i) the first distance, (ii) the second distance, (iii) a first predetermined location at which the first camera is mounted, and (iv) a second predetermined location at which the second camera is mounted; and a communication device configured to communicate the vehicle location to at least one of the vehicle or a remote control device off-board the vehicle prior to the vehicle starting to move along a route occupied by the vehicle.

* * * * *